US006907258B2

(12) United States Patent
Tsutsumi et al.

(10) Patent No.: US 6,907,258 B2
(45) Date of Patent: Jun. 14, 2005

(54) BASE STATION FOR A WIRELESS LOCAL AREA NETWORK, WIRELESS TERMINAL AND PROGRAM THEREOF

(75) Inventors: Takayuki Tsutsumi, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 442 days.

(21) Appl. No.: 10/252,513

(22) Filed: Sep. 24, 2002

(65) Prior Publication Data

US 2003/0186724 A1 Oct. 2, 2003

(30) Foreign Application Priority Data

Mar. 29, 2002 (JP) ....................................... 2002-097919

(51) Int. Cl.$^7$ ................................................. H04Q 7/00
(52) U.S. Cl. .................... 455/512; 455/450; 455/452.1; 370/458
(58) Field of Search ............................. 455/450, 452.1, 455/512, 524, 466, 434, 551, 445; 370/329, 412, 458, 252, 468

(56) References Cited

U.S. PATENT DOCUMENTS

| 4,788,543 A | * | 11/1988 | Rubin ....................... 340/7.21 |
| 5,541,919 A | | 7/1996 | Yong et al. |
| 6,674,765 B1 | * | 1/2004 | Chuah et al. ............... 370/458 |
| 6,731,947 B2 | * | 5/2004 | Hoagland et al. ........... 455/517 |
| 6,826,400 B1 | * | 11/2004 | Cashman et al. ........... 455/434 |
| 2003/0022672 A1 | * | 1/2003 | Yoshii et al. ............... 455/450 |
| 2004/0219923 A1 | * | 11/2004 | Oses et al. ................. 455/445 |

FOREIGN PATENT DOCUMENTS

| WO | WO 01/92992 | 12/2001 |
| WO | WO 02/07388 | 1/2002 |

OTHER PUBLICATIONS

Mangold, Stefan et al., "IEEE 802.11e Wireless LAN for Quality of Service", Internet Publication, Feb. 2002, XP-002251598, Retrieved from the Internet: URL:www.c-s.umn.edu/research/networking/seminar/802 11e.pdf> [retrieved on Aug. 18, 2003].

AT&T et al., "IEEE 802.11 QoS MAC Enhancements Joint Proposal passage", IEEE.802.11 QoS MAC Enhancements Joint Proposal, May 2000, pp. 1–50, XP-002209850.

* cited by examiner

*Primary Examiner*—Nick Corsaro
*Assistant Examiner*—Tan Trinh
(74) *Attorney, Agent, or Firm*—Young & Thompson

(57) ABSTRACT

A base station comprises table memory elements 104 for storing a priority data table 104A indicative of priorities of data set for every application, judge control elements 103 for judging priority of received data on the basis of the priority table and outputting data whose priorities are set to first buffer elements 105A and the data whose priorities are not set to second buffer elements 105B, beacon signal transmission elements for transmitting a beacon signal at a constant interval and transmission control elements 106 for transmitting the data buffered in the first buffer elements to a destination at a constant interval by using the beacon signal as a reference and, after the data buffered in the first buffer elements is transmitted, transmitting the data buffered in the second buffer elements to a destination.

41 Claims, 10 Drawing Sheets

BASE STATION FOR A WIRELESS LOCAL AREA NETWORK, WIRELESS TERMINAL AND PROGRAM THEREOF

BACKGROUND OF THE INVENTION

1. Field of the Invention

The present invention relates to a base station for a wireless local area network (LAN) and a wireless terminal connected to the base station through the wireless LAN and a computer program for realizing functions of the base station or the wireless terminal.

2. Description of the Related Art

LAN had been developed and has been utilized as a wired network initially. However, with the recent increase of operating speed thereof and the recent progress of mobile computing technology and mobile terminal, a wireless LAN having at least a portion thereof constructed with a wired network has been developed and utilized popularly.

In order to realize frequency band width and delay required by users and applications, an improvement of QoS (Quality of Service) of such wireless LAN is an important problem. In view of this, a system in which a base station sets eight priority steps from step 0 to step 7 correspondingly to kinds of data and transmits data in the priority order, has been proposed. In more detail, data having priority set by the base station and data whose priority is not set by the base station are buffered in a priority queue and a non-priority queue, respectively, and the data buffered in the priority queue is transmitted prior to transmission of the data buffered in the non-priority queue.

In a case where continuous data is transmitted to a base station through a hub or a router, a transmission interval of the continuous data is changed correspondingly to an amount of other data transmitted through the same path. Data received by the base station is buffered in the priority queue or the non-priority queue in receiving order thereof and the data buffered in the priority queue is transmitted to destinations in buffering order. Therefore, a wireless terminal to which data is transmitted can not receive the continuous data at a costant interval. As a result, delay of data reception in the wireless terminal is varied, causing QoS to be degraded.

Further, since the conventional wireless terminal has no function of setting priority of data and transmitting it with the priority set by the base station, an amout of delay of data is varied when data is transmitted from the wireless terminal to the base station or when data are transmitted and received within the wireless terminal, causing QoS to be degraded.

SUMMARY OF THE INVENTION

The present invention was made in view of solving the above mentioned problems and has an object to improve QoS of a wireless LAN.

In order to achieve the above object, a base station for a wireless LAN according to a first aspect of the present invention is featured by comprising table memory means for storing a priority data table indicative of priority of data set by the base station for every application, first buffer means for buffering data having priority set, second buffer means for buffering data whose priorities are not set, judge control means for judging priority of received data on the basis of the priority data table and outputting data whose priorities are set to the first buffer means and the data whose priorities are not set to the second buffer means, beacon signal transmission means for transmitting a beacon signal for synchronizing a communication with a wireless terminal at a constant interval and transmission control means for transmitting the data buffered in the first buffer means to a destination at a constant interval by using the beacon signal as a reference and, after the transmission of data buffered in the first buffer means is completed, transmitting the data buffered in the second buffer means to a destination.

By classifying priority of data finely compared with the prior art for every application, probability of simultaneous reception of different data having same priority in the base station is reduced and only same data are buffered in the first buffer means. By transmitting the same data buffered in the first buffer means at a constant interval, the data is received at a constant interval by the wireless terminal.

In the base station mentioned above, a plurality of the first buffer means may be provided correspondingly to the priorities of data. In such case, even when a plurality of data having priorities set are received simultaneously by the base station, it is possible to transmit the respective data at a constant interval.

The transmission control means may transmit data for every predetermined time correspondingly to priority of data, during a time period from a time at which the beacon signal is transmitted to a time at which a next beacon signal is transmitted. In such case, the communication speed becomes variable correspondingly to the priority of data.

Further, the transmission control means may include means for determining a data transmission time on the basis of a time slot defined by IEEE 802.11.

Further, the transmission control means may include means for transmitting data buffered in the respective first buffer means according to a predetermined order of the first buffer means. By setting the transmission sequence on the basis of the data transmission time, it is possible to reduce time for which priority data can not be transmitted during the time period from the transmission time of a beacon signal to the transmission of a next beacon signal.

Further, the transmission control means may include means for transmitting data buffered in the respective first buffer means in the priority sequence and, after data buffered in some of the first buffer means, which has a priority to be transmitted, is transmitted, transmitting data buffered in the plurality of the first buffer means corresponding to a next priority.

Further, the transmission control means may include means for transmitting data buffered in the plurality of the first buffer means by every predetermined amount of data or for every predetermined time according to the predetermined sequence of the plurality of the first buffer means.

Further, the transmission control means may include means for transmitting, when none of data to be transmitted exists in one of the plurality of the first buffer means, data buffered in another one of the plurality of the first buffer means, which corresponds to the next priority. In such case, it is possible to transmit non-priority data during a time obtained by the jump over the first buffer means having no data.

In such case, the transmission control means may include means for transmitting, when data having higher priority than that of data under transmission is buffered in the jumped first buffer means, the data buffered in the jumped first buffer means after the current data transmission is over. In such case, data having higher priority is transmitted preferentially. Incidentally, the expression "after the current data transmission is over" may be rewritten by "after data is transmitted until the first buffer means becomes empty" or "after a predetermined amount of data is transmitted or after data is transmitted for a predetermined time".

Further, the transmission control means may include means for transmitting data buffered in the respective first buffer means at a constant interval.

The judge control means may include means, which, when data having priority registered in the priority table is received, produces the first buffer means corresponding to that priority, and means, when data having priority corresponding to the first buffer means is not received for a predetermined time, deletes the first buffer means. By allowing only the first buffer means corresponding to the necessary priority to produce continuously, it is possible to effectively utilize a memory capacity of the first buffer means.

The base station may further include data size regulation means for regulating size of data outputted from the judge control means to a predetermined size and outputting the size-regulated data to the first buffer means or the second buffer means. In such case, it is possible to transmit data having a constant size at a constant interval by the transmission control means even if the original size of the data is large.

The base station may further include transmission time regulation means for monitoring a transmission time of data transmitted from the transmission control means and, when a transmission time of data buffered in the second buffer means is shorter than a predetermined time, instructing the transmission control means of shortening of a transmission time of data buffered in the first buffer means. In such case, it is possible to prolong the transmission time of data buffered in the second buffer means.

The base station may further include means for providing a transmission phase for performing a transmission of data to a wireless terminal and a receiving phase for performing a reception of data from a wireless terminal in different time periods each between adjacent beacon signals.

The base station may further include means for providing a transmission phase for performing a transmission of data to a wireless terminal and a receiving phase for performing a reception of data from a wireless terminal in a time period between adjacent beacon signals.

The base station may further include means for transmitting a transmission request to a wireless terminal having PCF (Point Coordination Function) defined by IEEE 802.11 in the transmission phase and receiving data transmitted from the wireless terminal, which receives the transmission request, in the receiving phase.

The priority table records a range of communication port number and priority in correspondence with each other and the judge control means may include means for judging the priority on the basis of the communication port number of data received.

Alternatively, the priority table records a value of priority bit of a header of data and priority in correspondence with each other and the judge control means may include means for judging the priority on the basis of the priority bit of the data received through the LAN.

The priority bit may be defined in a reserve bit of a service field of PLCP (Physical Layer Convergence Procedure) header defined by IEEE 802.11.

Alternatively, the priority bit may be defined in TOS (Type of Service) field of IP header.

The base station may include means for transmitting GARP (Generic Attribute Registration Protocol) defined by IEEE 802.1d, q to nodes connected to the LAN and means for broadcasting, when data having destination to a group MAC address registered in GARP is received, the received data to the wireless terminals.

In the base station, the table memory means further stores a beacon interval table for corresponding header value of data with the interval between beacon signals. The judge control means may include means for detecting the header value of the received data and, when the detected header value exists in the beacon interval table, reading an interval corresponding to the detected header value and outputting the latter to the beacon signal producing means. The beacon signal producing means may include means for changing the interval of the beacon signal to an interval inputted from the judge control means. By changing the beacon signal interval correspondingly to data compression rate, it is possible to eliminate a break of data when the compressed data is expanded in the receiving terminal.

In such case, when there are a plurality of beacon signal intervals to be changed, the judge control means may include means for selecting a minimum interval and outputting it to the beacon signal producing means. Therefore, data break does not occur in any of terminals, which receives data transmitted from the base station.

The base station may further include input means for changing a content of the priority table, transmission means for transmitting the priority table to other base stations and at least one of wireless terminals connected through the LAN periodically or when the content of the priority table is changed by the input means and update means for, when the other base stations and the at least one wireless terminal receive the priority table, updating priority tables of the other base stations and the at least one wireless terminal on the basis of received priority table. In such case, the mutually connected base stations or wireless terminals can hold the priority table in common.

The transmission means may include means for transmitting an information, which is changed by the priority table, during a time period from the transmission of the priority table to a next transmission thereof In such case, efficient transmission and update becomes possible.

The transmission means may include means for transmitting a packet including control bits for distinguishing between registration and delete, which include MAC address of data transmitting side, MAC address of destination side, protocol number, communication port number and priority.

The transmission means may include means for transmitting a packet including control bits for distinguishing between registration and delete, which include value of priority bit of header of data and priority.

The base station may further include input means for changing a content of the beacon interval table, transmission means for transmitting a beacon interval table to other base stations connected through the LAN periodically or when the content of the beacon interval table is changed by the input means and update means for, when the other base stations receive the beacon interval table, updating beacon interval tables of the other base stations on the basis of received beacon interval table. In such case, the mutually connected base stations or wireless terminals can hold the beacon interval table in common.

The transmission means may include means for transmitting an information, which is changed in the beacon interval table, during a time period from the transmission of the beacon interval table to a next transmission thereof. In such case, efficient transmission and update becomes possible.

The base station may further include input means for changing the predetermined amount or the predetermined time, transmission means for transmitting the predetermined amount or the predetermined time to other base stations connected through the LAN periodically or when the content of the predetermined amount or the predetermined time is changed by the input means and update means for, when the other base stations receive the predetermined amount or the predetermined time, updating the predetermined amount or the predetermined time of the other base stations on the basis of received predetermined amount or the predetermined time. In such case, the mutually connected base stations can hold values, which are to be preliminarily set, in common.

A wireless terminal according to a second aspect of the present invention is featured by comprising table memory means for storing a priority table of data indicative of priority of data set for every application, first buffer means for buffering data having priority set, second buffer means for buffering data whose priority is not set, judge control means for judging priority of received data on the basis of the priority table and outputting data having priority set to the first buffer means and data having priority not set to the second buffer means and output control means for transmitting the data buffered in the first buffer means to an application of its own terminal preceding to data buffered in the second buffer means. Therefore, data having higher priority is preferentially outputted to the application of the wireless terminal.

A wireless terminal according to a third aspect of the present invention is featured by comprising table memory means for storing a priority table of applications for executing predetermined services and data indicative of priority of data set for every application, first buffer means for buffering data having priority set, second buffer means for buffering data whose priority is not set, judge means for judging priority of data inputted by the application on the basis of the priority table and outputting data having priority set to the first buffer means and data having priority not set to the second buffer means and transmission control means for transmitting the data buffered in the first buffer means to a base station preceding to the data buffered in the second buffer means. Therefore, it is possible to preferentially transmit data having higher priority from the wireless terminal to the base station.

The priority table records at least a range of communication port number and priority in correspondence with each other and the judge control means may include means for judging the priority on the basis of the communication port number of data inputted from the application.

The judge means includes means for judging priority of data on the basis of transmitting side MAC address and communication port number of the data transmitted from the base station in the priority table and the transmission control means may include means for transmitting data having priority judged by the judge means to the base station in a receiving phase in which the base station receives data from a wireless terminal.

The transmission control means may include back-off means, which becomes standby state for a randomly set back-off time when the base station competes in transmission of data with other wireless terminal. In such case, probability of competition of the base station with other wireless terminal in a next data transmission becomes low since, when a plurality of wireless terminals are in standby state, back-off times thereof are different.

The back-off means may include means for setting the maximum value of the back-off time in transmitting data having priority set to a value smaller than the maximum value of the back-off time in transmitting data having priority not set.

The back-off means may include means for setting the maximum value of the back-off time in transmitting data having priority set to a value smaller than a predetermined value.

In the latter case, since the back-off time in transmitting the data having priority set is shortened, transmission of data having priority set can be expedited.

The back-off means may include means for setting the back-off time correspondingly to the priority of data to be transmitted. By making the back-off time in reverse proportion to the priority of data, the data having higher priority can be transmitted sooner.

A computer program according to the present invention is to realize a table memory function of storing a priority table of data indicative of priority of data set for every application, a first buffer function of buffering data having priority set, a second buffer function of buffering data whose priority is not set, a judge control function of judging priority of received data on the basis of the priority table and outputting data whose priority is set to the first buffer function and the data whose priority is not set to the second buffer function, a beacon signal transmission function of transmitting a beacon signal for synchronizing a communication with a wireless terminal at a constant interval and a transmission control function of transmitting the data buffered by the first buffer function to a destination at a constant interval by using the beacon signal as a reference and, after the data buffered by the first buffer function is transmitted, transmitting the data buffered by the second buffer function to a destination.

According to another aspect of the present invention, a computer program realizes a table memory function of storing a priority table of data indicative of priority of data set for every application, a first buffer function of buffering data having priority set, a second buffer function of buffering data whose priority is not set, a judge function of judging priority of received data on the basis of the priority table and outputting data whose priority is set to the first buffer function and the data whose priority is not set to the second buffer function and a output control function of outputting the data buffered by the first buffer function to an application of own terminal preceding to the data buffered by the second buffer function.

According to another aspect of the present invention, a computer program realizes a table memory function of storing a priority table of data indicative of priority of data set for every application for executing predetermined services, a first buffer function of buffering data having priority set, a second buffer function of buffering data whose priority is not set, a judge function of judging priority of received data on the basis of the priority table and outputting data whose priority is set to the first buffer function and the data whose priority is not set to the second buffer function and a transmission control function of outputting the data buffered by the first buffer function to a base station preceding to the data buffered by the second buffer function.

BRIEF DESCRIPTION OF THE DRAWINGS

The present invention will be described in detail with reference to the accompanying drawings, in which.

DETAILED DESCRIPTION OF THE PREFERRED EMBODIMENTS

First Embodiment

Figure 1:
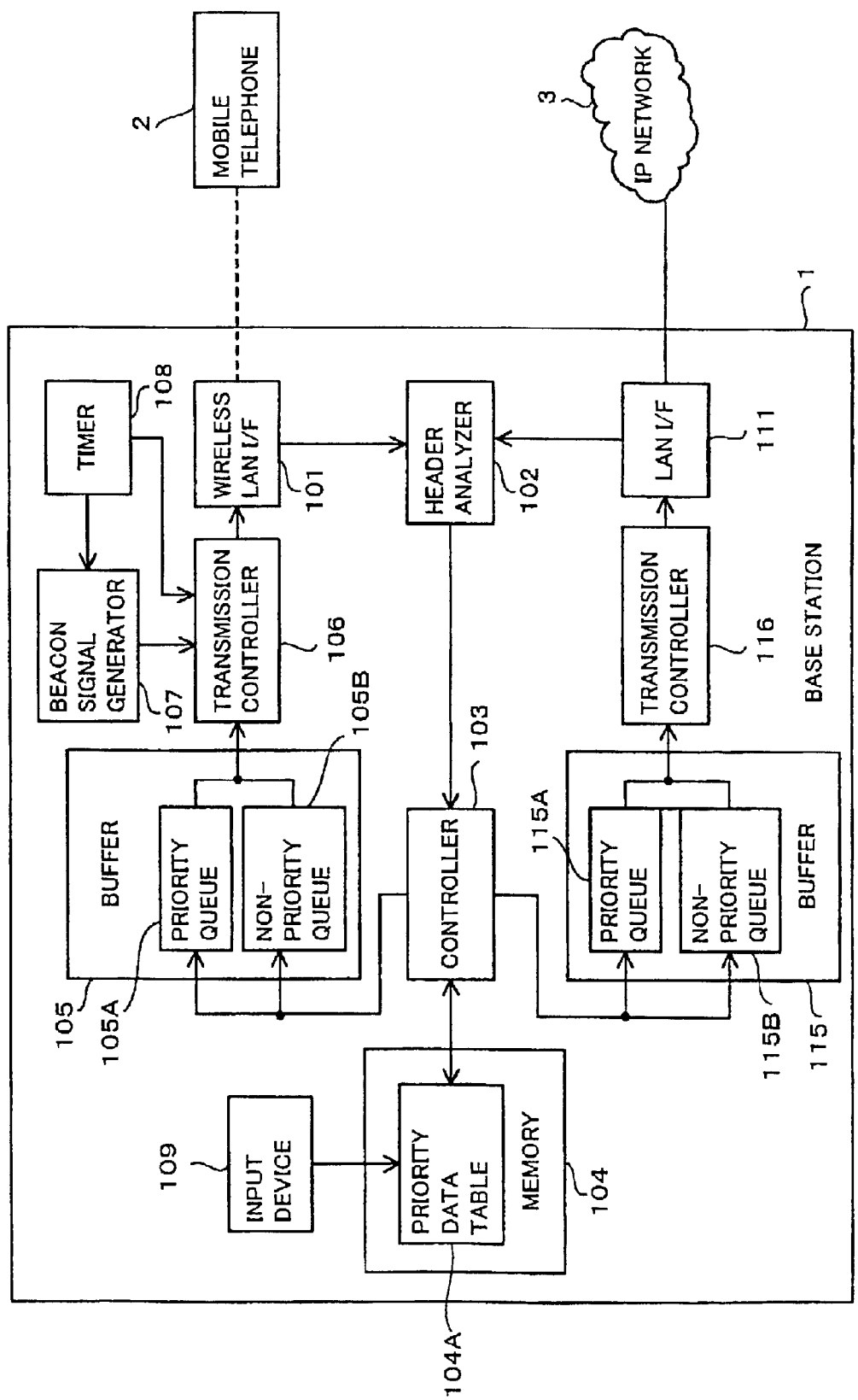
FIG. 1 is a block diagram showing a construction of a base station according to a first embodiment of the present invention.

FIG. 1 is a block diagram showing a construction of a base station according to the first embodiment of the present invention. In FIG. 1, a base station 1 includes a wireless LAN interface 101, a header analyzer 102, a controller 103, a memory 104, a buffer 105, a transmission controller 106, a beacon signal generator 107, a timer 108, an input device 109, a LAN interface 111, a buffer 115 and a transmission controller 116.

The wireless LAN interface 101 is an interface between the base station 1 and a mobile telephone 2 to perform a data exchange between them through a wireless LAN 4. The wireless LAN is a radio communication system exemplified by IEEE 802.11 and is not specified in the present invention.

The header analyzer 102 analyzes data received by the wireless LAN Interface 101 and outputs a result of analysis to the controller 103. In more detail, the header analyzer 102 analyzes an information contained in a header of the received data such as physical layer header, IP (Internet Protocol) header, TCP (Transmission Control Protocol) header and UDP (User Datagram Protocol) header, extracts a bit value of a predetermined portion in which such as, for example, a transmitting side MAC address, a destination MAC address, a protocol number and a communication port number are stored and outputs the bit value to the controller 103. The bit value may be 1 bit or at least 2 bits. In the latter case, the predetermined portion may be continuous or discontinuous.

The memory (table memory means) 104 stores a priority data table (priority table) 104A, which defines correspondence between header and priority of data. In more detail, the range of communication port number of the data portion described in a predetermined location of the datagram of the packet having the preset header is described in the priority data table 104A together with the priority thereof corresponding to the range. Since the communication port number is set for an application, it is possible to set a priority for every application by making the communication port number range correspondent to the priority. The term "application" used here means a predetermined service such as, for example, the telephone function or the image sending function.

The priority data table 104A may further store the data transmitting side MAC address, the destination side MAC address, the protocol number and the effective time, etc. Incidentally, by registering only one of the transmitting side MAC address and the destination side MAC address, it becomes possible to set the priority with priorities of one of the transmitting side and the destination side being fixed. Although the priority basically includes at least two orders, there may be a case where the priority includes one order.

The input device 109 is to change the content of the priority data table 104A, such as to register or delete data in the priority data table 104A, and is constructed with, for example, a keyboard or a touch panel, etc.

The controller (judge control means) 103 judges the priority of the received data by referring to the priority data table 104A on the basis of the result of analysis of the header of the received data by the header analyzer 102. In more detail, the controller 103 judges the received data as a priority data when at least the communication port number among the information described in the header of the received data exists in the priority data table 104A and, otherwise, as a non-priority data. When the received data is judged as the priority data, the priority corresponding to the communication port number, etc., is judged as the priority of the received data.

The controller 103 further sends the priority data to the priority queue 105A of the buffer 105 or the priority queue 115A of the buffer 115 and sends the non-priority data to the non-priority queue 105B of the buffer 105 or the non-priority queue 115B of the buffer 115. In this case, when the destination of the received data is the radiotelephone 2 connected to the base station 1 through the radio LAN 4, the received data is sent to the buffer 105 and, when the destination of the received data is the IP network 3 connected to the base station 1 through the LAN 5, the received data is sent to the buffer 115.

The priority queue (first buffer means) 105A of the buffer 105 buffers the priority data sent from the controller 103 and the non-priority queue (second buffer means) 105B buffers the non-priority data. In the priority queue 105A, a transmission band is prelimiarily set.

The timer 108 outputs a time data to the transmission controller 106 and the beacon signal generator 107.

The beacon signal generator 107 produces a beacon signal for synchronizing the communication with respect to the radiotelephone 2 at a constant interval and outputs the beacon signal to the transmission controller 106. Incidentally, the beacon signal is defined by IEEE 802.11.

The transmission controller 106 controls the transmission of the beacon signal inputted from the beacon signal generator 107 to the wireless LAN 4 through the wireless LAN Interface 101 and the preferential transmission of the priority data buffered by the priority queue 105A preceding to the transmission of the non-priority data buffered in the non-priority queue 105B. The priority data is transmitted at a constant interval by using the beacon signal as a reference. The transmission time of the priority data and the non-priority data may be determined by the transmission controller 106 according to the Slot Time defined by IEEE 802.11.

Incidentally, the beacon signal generator 107, the transmission controller 106 and the wireless LAN Interface 101 constitute the beacon signal transmission means.

Further, the LAN Interface 111 is an interface between the base station 1 and the LAN 5 and can exchange data with the IP network 3 through the LAN 5. The LAN 5 may be a known LAN such as a 10Base-T or a 100Base-T.

The priority queue 115A of the buffer 115 buffers the priority data sent from the controller 103 and the non-priority queue 115B thereof buffers the non-priority data from the controller 103. The transmission band is preliminarily set in the priority queue 115A.

The transmission controller 116 controls the preferential transmission of the priority data buffered in the priority queue 115A through the LAN Interface 111 to the LAN 5 preceding to the transmission of the non-priority data buffered in the non-priority queue 115B. Incidentally, The transmission time of the priority data and the non-priority data by the transmission controller 116 may be determined according to the Slot Time defined by IEEE 802.11.

Figure 2:
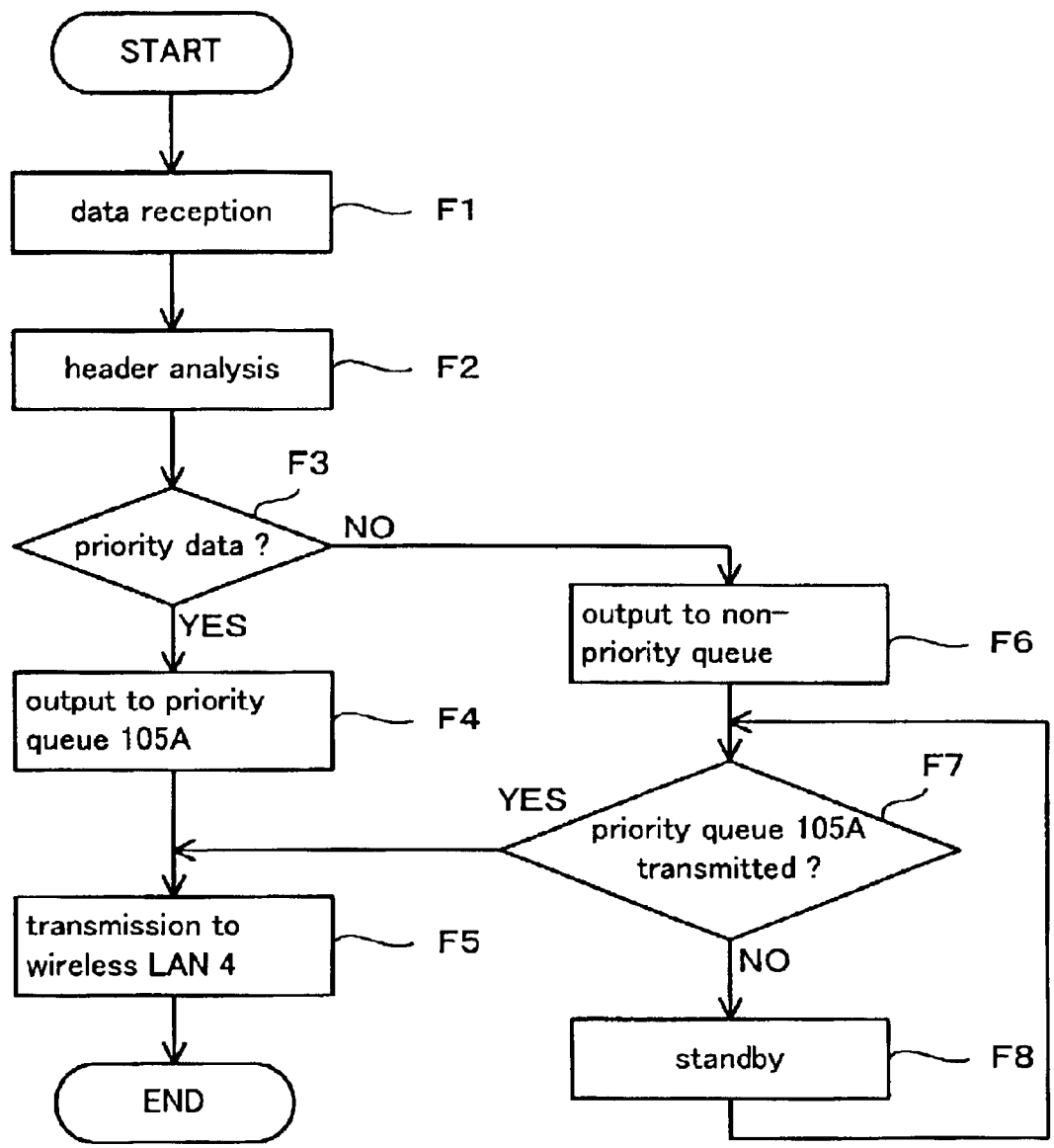
FIG. 2 is a flowchart of an operation of the base station shown in FIG. 1.

Now, an operation of the base station 1 will be described with reference to a case where a message data received by the LAN 5 is transmitted to the radiotelephone 2 as an example. FIG. 2 is a flowchart showing the operation of the base station 1.

When the base station 1 receives the message data from the LAN 5 (Step F1), the header of the message data is analyzed (Step F2) and the message data is judged as a priority data if the priority corresponding to the communication port number described in the header is registered in the priority data table 104A and as a non-priority data if the priority thereof is not registered in the same table.

When the message data is judged as the priority data (YES in Step F3), the message data is buffered in the priority queue 105A of the buffer 105 (Step F4) and then transmitted at a constant interval to the radiotelephone 2 with using the beacon signal as a reference (Step F5).

On the other hand, when the message data is judged as the non-priority data (NO in Step F3), the message data is buffered in the non-priority queue 105B of the buffer 105 (Step F6). The base station 1 is standing by during a time for which the message data is being transmitted from the priority queue 105A (NO in Step F7) (Step F8) and, after the transmission of the message data from the priority queue 105A is completed (YES in Step F7), transmits the message data buffered in the non-priority queue 105B similarly (Step F5).

In this embodiment, it is possible to set the priority for every application by making the communication port number range correspondent to the priority. Therefore, since the priority is finely sectioned campared with the conventional manner, probability of a case where message data having different priorities are received simultaneously by the base station 1 is small and the priority queue 105A buffers only identical message data.

Figure 3:
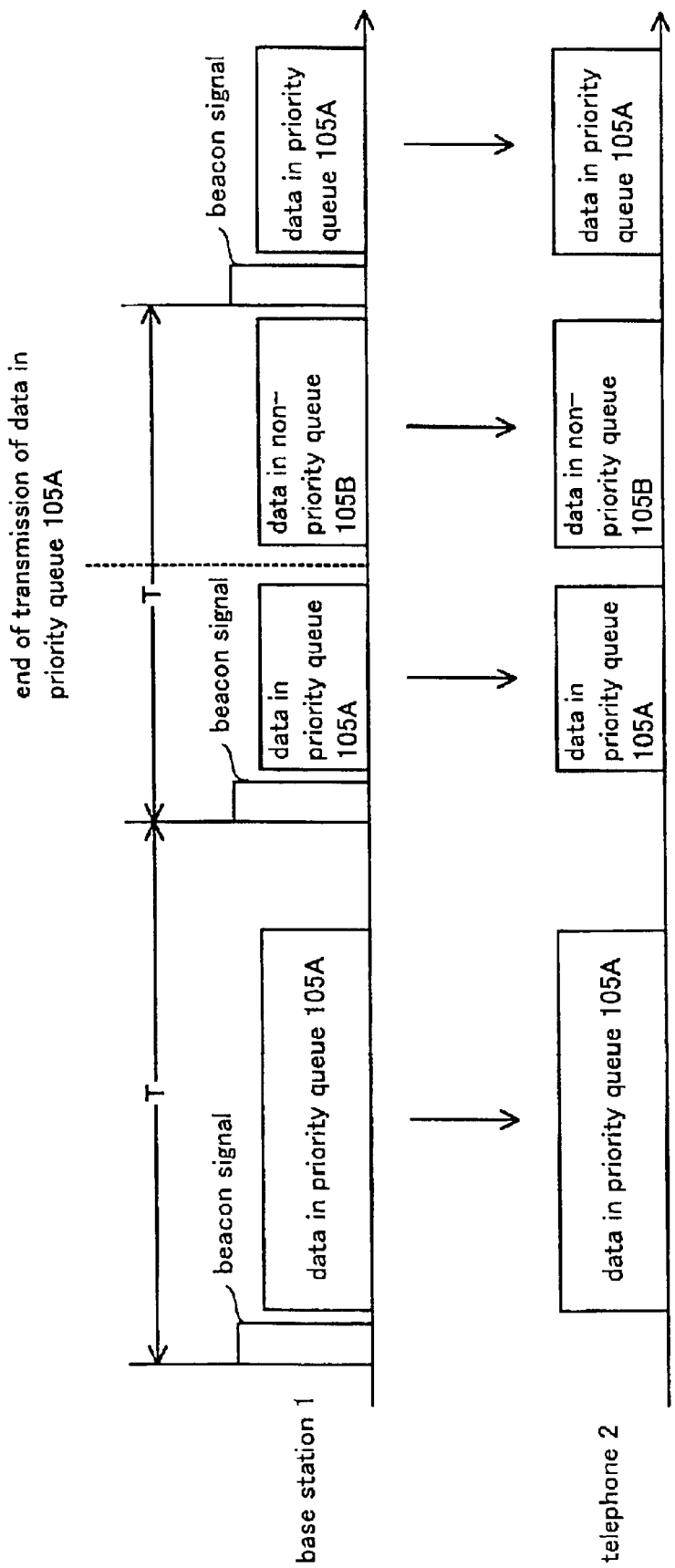
FIG. 3 conceptually shows a transmission of communication data by the base station and a receiving of communication data by a mobile telephone.

Further, by transmitting the message data buffered in the priority queue 105A from the base station 1 at a constant interval T as shown in FIG. 3(*a*), the destination radiotelephone 2 can receive the message data at the constant interval T as shown in FIG. 3(*b*). Therefore, it is possible to reduce variation of delay in receiving the data in the radiotelephone 2 to thereby improve QoS. For example, even when a reception of continuous data including voice and moving picture is required, it is possible to receive the data at the constant interval T and a continuous reproduction becomes possible.

Although the case where the communication port number range is made correspondent to the priority in the priority data table 104A has been described, it may be possible to record the priority bit values of the header of the data correspondingly to the priorities in the priority data table 104A. However, the priority bit values are set for respective applications. In such case, the header analyzer 102 detects the priority bits from the header of the received data and the controller 103 judges the priority on the basis of the detected priority bits.

In more detail, the priority bits of the data transmitted/received through the wireless LAN 4 can be defined in Reserve Bit of Service Field of PLCP (Physical Layer Convergence Procedure) header determined by IEEE 802.11. In such case, the radiotelephone 2 should include means for adding a value indicative of the priority to the Reserve Bit of the Service Field of the PLCP header during the data transmission and the base station 1 should include means for, when the destination side MAC address of the received data is other than that of the radiotelephone 2, defining the priority bit in the priority field determined by IEEE 802.1d, q and adding a value indicative of the priority.

Further, the priority bit of the data received through the LAN 5 can be defined in TOS (Type of Service) of the IP header. In such case, the base station 1 should include means for adding a value indicative of the priority to the Reserve Bit of the Service Field of the PLCP header during the data transmission and the base station 1 should include means for, when the destination side MAC address of the received data is that of the radiotelephone 2, adding a value indicative of the priority to the Reserve Bit of the Service Field of the PLCP header correspondingly to the value of the priority bit defined in the TOS field of the IP header.

Further, the base station 1 may include means for transmitting GARP (Generic Attribute Registration Protocol) defined by IEEE 802.1d, q to a node of such as switch and bridge connected through the LAN 5 and means for broadcasting, when data having destination to a group MAC address registered by GARP is received, the received data to the mobile telephones 2.

Second Embodiment

Figure 4:
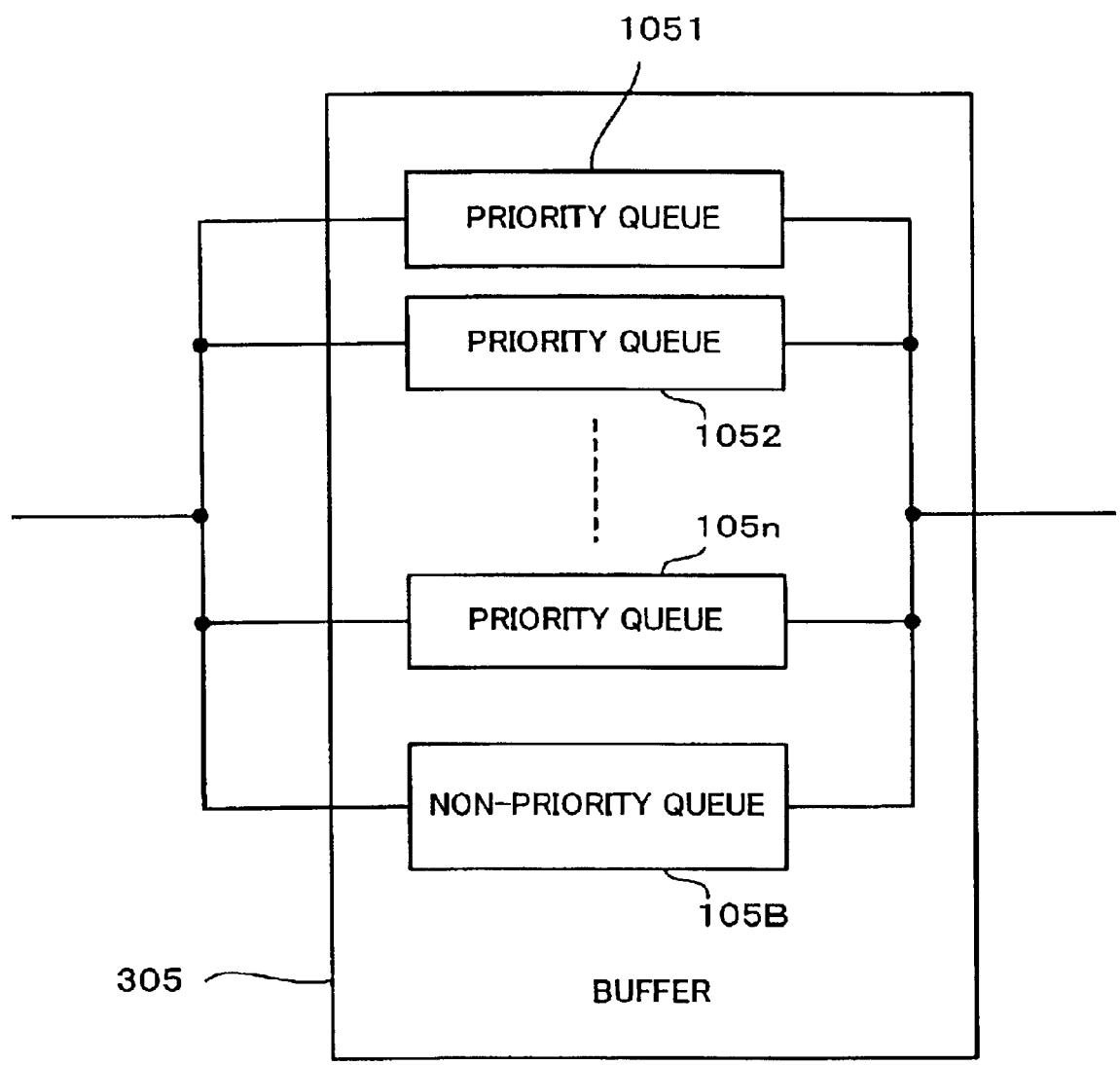
FIG. 4 is a bock diagram showing a construction of a portion of a base station according to a second embodiment of the present invention.

FIG. 4 is a block diagram showing a construction of a portion of a base station according to a second embodiment of the present invention. The base station shown in FIG. 4 includes, in lieu of the buffer 105 in the first embodiment, a buffer 305 having a plurality of priority queues 1051 to 105*n*, where n is an integer equal to or larger than 2. When the priority includes 2 or more orders, each of the priority queues 1051 to 105*n* buffers a priority data of every priority. By providing the priority queues 1051 to 105*n* in such manner, it is possible, even when a plurality of priority data are received simultaneously by the base station 1, to transmit these data to the respective mobile telephones at the constant interval T. Therefore, the radiotelephones can receive the message data at the constant interval T.

In this case, the transmission controller 106 transmits buffered data to the priority queues 1051 to 105*n* in time periods, which are prelimiarily set correspondingly to the priorities of the data, respectively, during a time from the transmission of the beacon signal to a next transmission of the beacon signal. Usually, data having the higher priority is transmitted for longer transmission time at higher transmission speed. The transmission time may be determined on the basis of the Slot Time defined by IEEE 802.11.

Further, the transmission controller 106 may transmit data buffered in the respective priority queues 1051 to 105*n* according to a sequence preliminarily set for the respective priority queues 1051 to 105*n*. In such case, it is possible, by setting the transmission sequence on the basis of the transmission times of the respective priority queues 1051 to 105*n*, to reduce time between adjacent beacon signals, during which priority data can not be transmitted. Further, it is possible, by transmitting the data buffered in the respective priority queues 1051 to 105n for preliminarily set times according to a preliminarily set sequence of the priority queues, to transmit the data buffered in the priority queues 1051 to 105n at a constant interval.

The data transmission system of the transmission controller 106 includes the priority type and the priority order type. In the priority type data transmission system, the data buffered in the priority queues 1051 to 105n are transmitted in a sequence from data having highest to data having lowest priority and, after data buffered in a certain priority queue 105i, which is to be transmitted, disappear, data buffered in a next priority queue 105(i+1) is transmitted, where i is an integer within a range from 1 to n. On the other hand, in the priority sequence type data transmission system, data buffered in the respective priority queues 1051 to 105n are transmitted according to a preliminarily set sequence of the priority queues by a predetermined amount (data size or packet number, etc.) thereof or in a predetermined time. Incidentally, a complex type data transmission system of the priority type and the priority sequence type may be used, in which data in a queue is transmitted in a transmission band for each priority in a predetermined time and then the queue is switched to a next queue.

In any transmission system, it is possible, when there is no data buffered in the queue 105i and to be transmitted, to jump over the queue 105I and transmit data buffered in the next priority queue 105(i+1). In such case, it is possible to transmit non-priority data buffered in the non-priority queue 105B in a time obtained by jump-over of the priority queue 105i.

In this case, when data having higher priority than that of data under transmission is buffered in the priority queue 105i, which is jumped over, it is preferable to transmit the data buffered in the priority queue 105i after the data transmission of the priority queue 105(i+1) is completed. Thus, it is possible to preferentially transmit data having high priority.

Incidentally, it is possible to provide a plurality of priority queues for data having identical priorities to thereby share data transmission amount or data transmission time.

The controller 103 may be constructed such that, in response to a reception of data whose priority is registered in the priority table is received, the controller 103 produces the priority queue 105i corresponding to that priority in the buffer 305 and, when data having priority corresponding to the priority queue 105j existing in the buffer 305 is not received for a predetermined time, deletes the priority queue 105j, where j is an integer in a range from 1 to n. By allowing only priority queues 1051 to 105n corresponding to the required priorities to exist continuously in this manner, it is possible to effectively utilize the memory capacity of the buffer 305.

The transmission bands are preliminarily assigned to the respective priority queues 1051 to 105n. The transmission bands of the priority queues 1051 to 105n may be identical or may be changed correspondingly to the priorities.

Further, it is possible to use the buffer having a plurality of priority queues, in lieu of the buffer 115.

Third Embodiment

Figure 5:
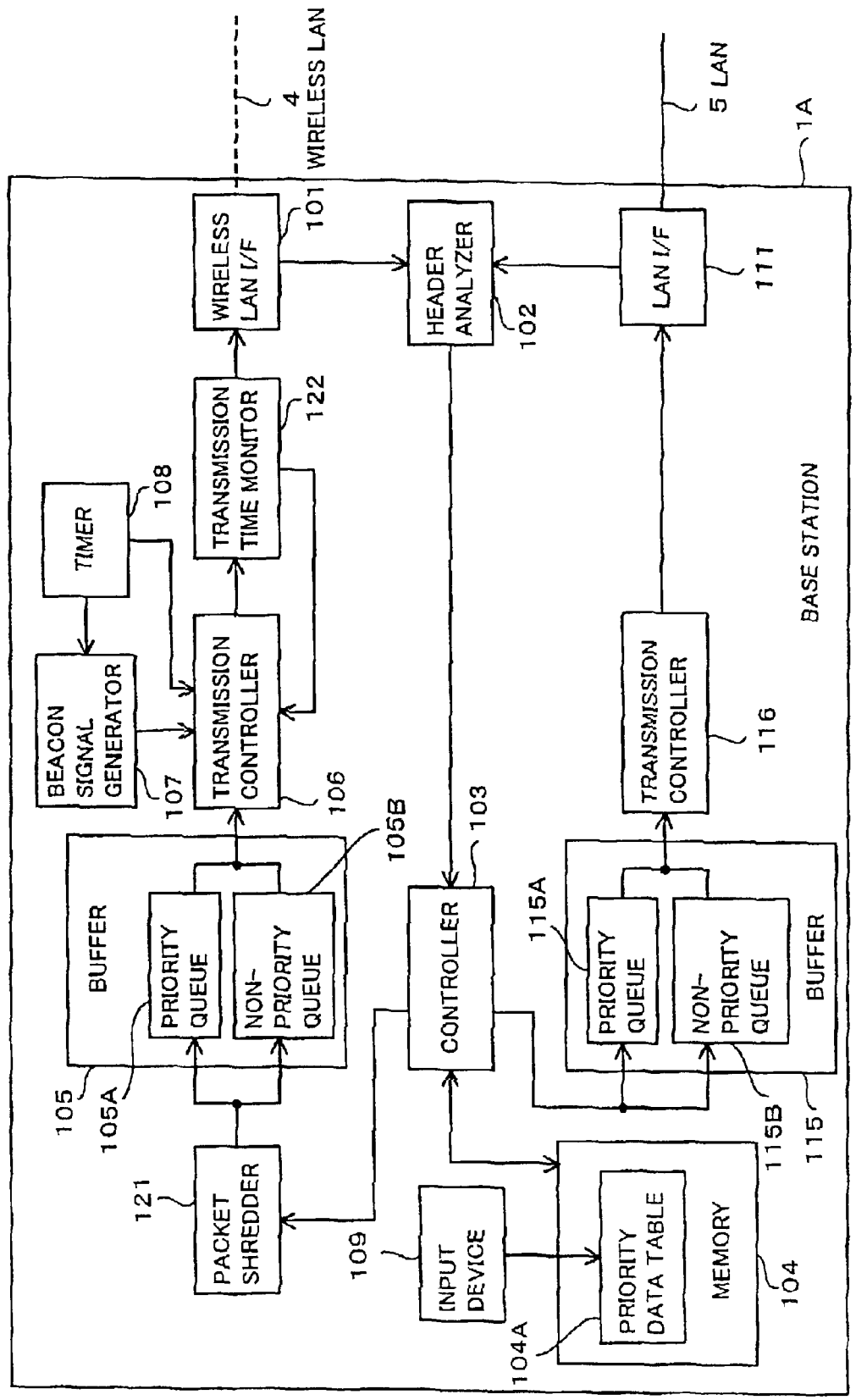
FIG. 5 is a block diagram showing a construction of a base station according to a third embodiment of the present invention.

FIG. 5 is a block diagram showing a construction of a base station according to a third embodiment of the present invention. The base station 1A shown in FIG. 5 is featured by that a packet shredder (data size regulator means) 121 and a transmission time monitor 122 are added to the base station 1 shown in FIG. 1.

The packet shredder 121 functions to regulate the data outputted from the controller 103 to a predetermined size and to output the size regulated data to the priority queue 105A or the non-priority queue 105B. With this construction of the base station, it is possible, even when the data size is too large to transmit it within the time between adjacent beacon signals, to standardize the data size by using the packet shredder 121 to thereby transmit it within the time between adjacent beacon signals. Therefore, it is possible to transmit data at constant interval regardless of the original size thereof.

The transmission time monitor (transmission time regulator means) 122 functions to monitor a transmission time of data transmitted by the transmission controller 106 and, when a transmission time of the non-priority data buffered in the non-priority queue 105B is shorter than a predetermined time, to automatically instruct the transmission controller 106 of shortening of a transmission time of priority data buffered in the priority queue 105A. With this construction, it is possible to hold the transmission time of the non-priority data such that the non-priority data is transmitted to its destination. Incidentally, it may be possible, for the buffer 305 shown in FIG. 4, to shorten the transmission times of the respective priority data by identical rate.

Fourth Embodiment

Figure 6:
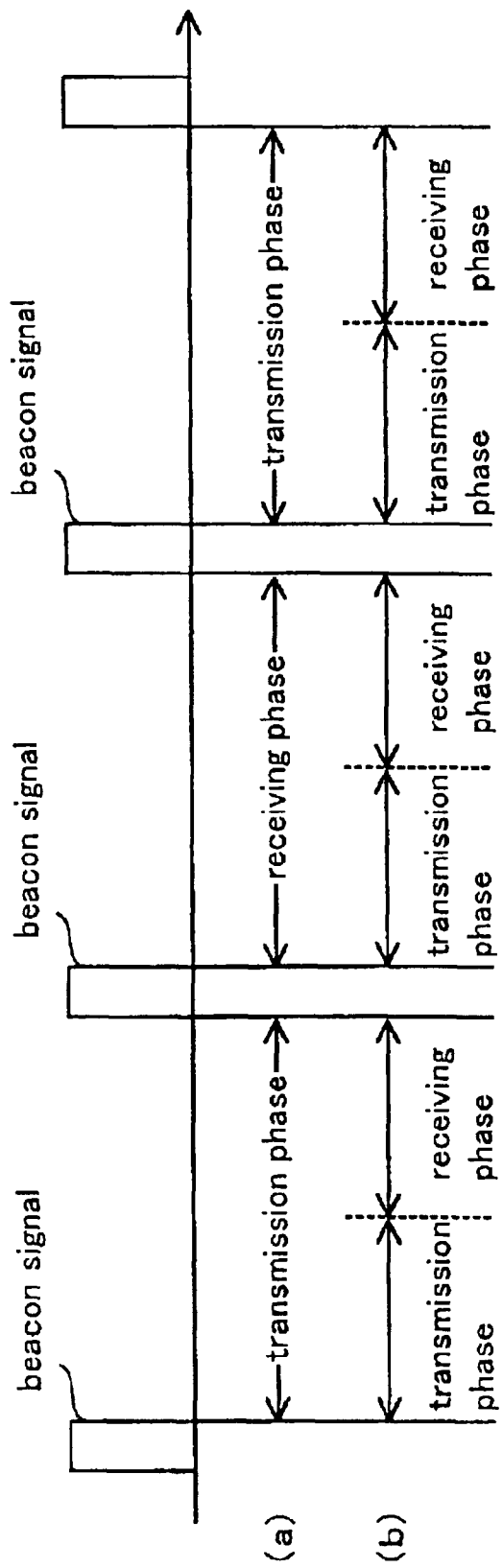
FIG. 6 conceptually shows an operaton of a base station according to a fourth embodiment of the present invention.

FIG. 6 illustrates an operation of a base station according to a fourth embodiment of the present invention. This base station performs data transmission/receiving in a transmission phase in which data is transmitted to the radiotelephone 2 and in a receiving phase in which data from the radiotelephone 2 is received.

In an example, the transmission phase is set in a time between adjacent beacon signals and the receiving phase is set in a different time between adjacent beacon signals as shown in FIG. 6(a). In more detail, in order to distinguish between transmission and receiving, 2 group values of a time stamp of the beacon signal produced by the beacon signal generator 107 are preliminarily set in the transmission controller 106. For example, it is assumed that an even number of the time stamp value indicates a transmission and an odd number of the time stamp indicates a receiving. The transmission controller 106 judges whether the time stamp value of the beacon signal inputted from the beacon signal generator 107 indicates a transmission or a receiving. When the time stamp value indicates a transmission, a time period from that beacon signal to a next beacon signal is determined as the transmission phase and the data buffered in the priority queue 105A and the non-priority queue 105B are transmitted to the radiotelephone 2. On the other hand, when the time stamp value indicates the receiving, the time period from that beacon signal to a next beacon signal is determined as the receiving phase and a reception of only data from the radiotelephone 2 is performed.

As another example, a transmission phase and a receiving phase are provided in the time period between adjacent beacon signals, as shown in FIG. 6(b). For example, a predetermined time period after the beacon signal is inputted to the transmission controller 106 is made the transmission phase and the receiving phase is set in a predetermined time period until a next beacon signal is inputted after the transmission phase. The order of the transmission phase and the receiving phase may be reversed.

When the base station has PCF (Point Coordination Function) defined by IEEE 802.11, it may be possible to transmit a transmission request to a radiotelephone 2 having PCF and to receive data transmitted from the radiotelephone 2, which receives the transmission request, in the above mentioned receiving phase.

Fifth Embodiment

Figure 7:
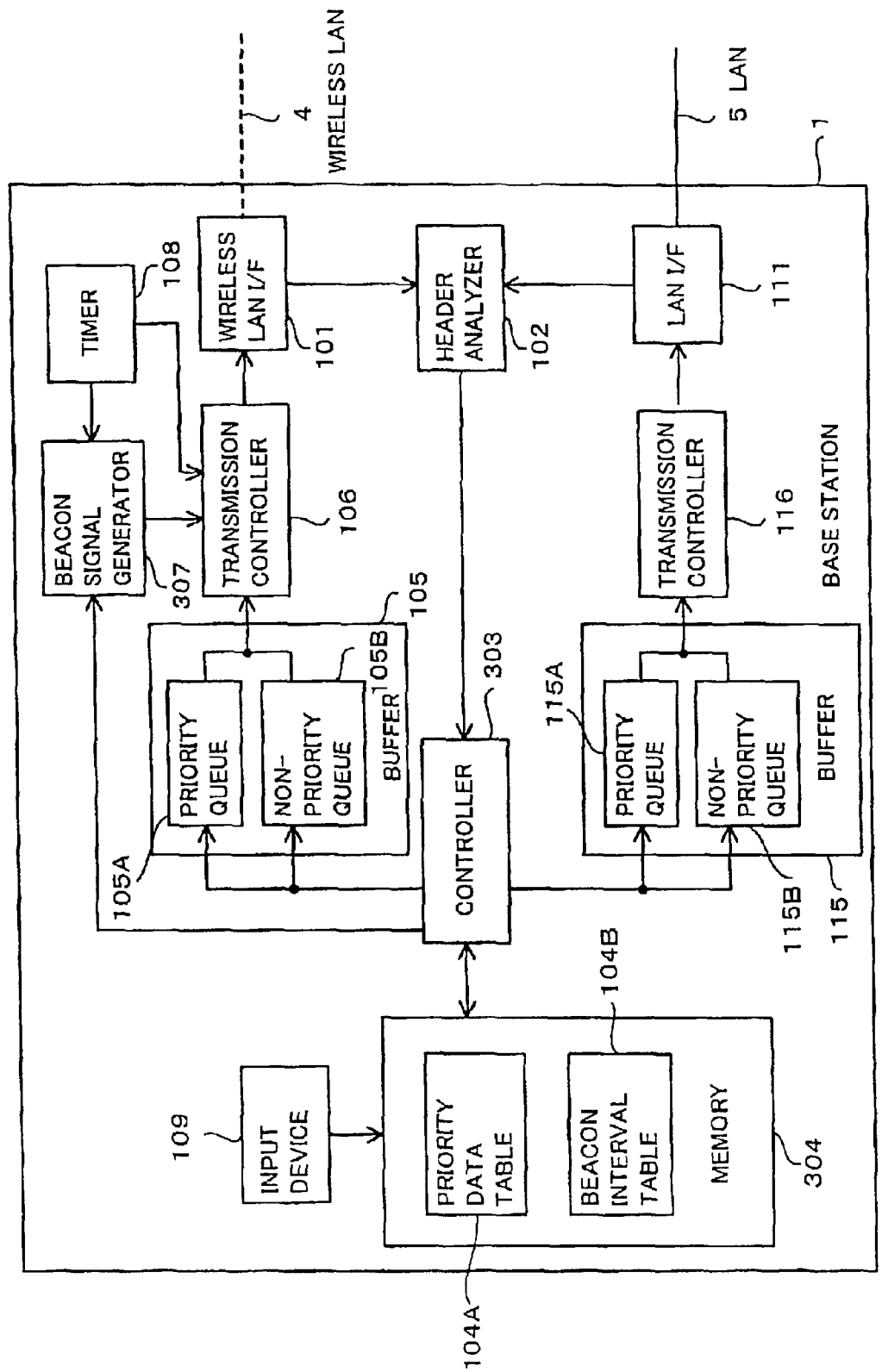
FIG. 7 is a block diagram showing a construction of a base station according to a fifth embodiment of the present invention.

FIG. 7 is a block diagram showing a construction of a base station according to a fifth embodiment of the present invention. In the base station 1B shown in FIG. 7 is featured by comprising a controller 303, a memory 304 and a beacon signal generator 307 in lieu of the controller 103, the memory 104 and the beacon signal generator 107 of the base station 1 shown in FIG. 1.

The memory 304 stores a beacon interval table 104B in addition to the priority data table 104A. In the beacon interval table 104B, header values of data such as, for example, codec types of the RTP (Real Time Transport Protocol) communication and beacon signal intervals are provided in mutual correspondence.

The controller 303 has, in addition to the function of the controller 103 of the base station 1 shown in FIG. 1, a function of reading a beacon signal interval corresponding to a header value of a received data when the header value exists in the beacon inteval table 104B and outputting the beacon signal interval to the beacon signal generator.

The beacon signal generator 307 has a function of changing the beacon signal interval to that inputted from the controller 303.

Figure 8:
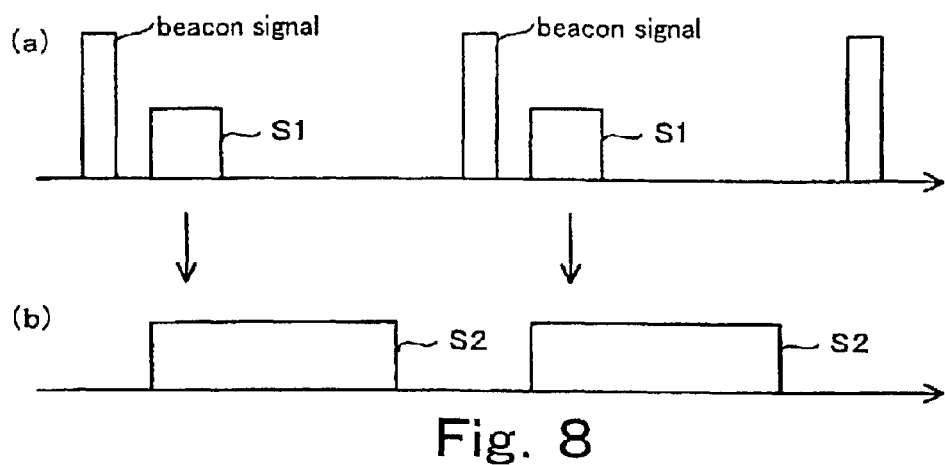
FIG. 8 conceptually shows an operaton of the base station shown in FIG. 7.

Data transmitted/received through the wireless LAN 4 is usually compressed. Even when a compressed data S1 is transmitted in the base station 1 shown in FIG. 1 at a constant interval with using the beacon signal as the reference as shown in FIG. 8(a) and can be received at a constant interval by the radiotelephone 2, a data S2 obtained by expanding the compressed data S1 may becomes discontinuous if the compression rate of the compressed data S1 is large as shown in FIG. 8(b).

Figure 9:
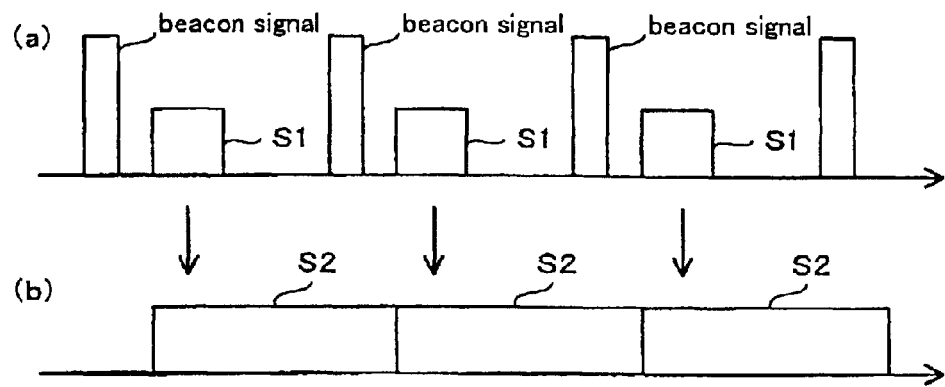
FIG. 9 conceptually shows an operaton of the base station shown in FIG. 7.

In the present invention, however, such discontinuity of the data S2 obtained in the receiving radiotelephone 2 by expanding the compressed data S1 can be eliminated as shown in FIG. 9(b) by changing the beacon signal interval correspondingly to the compression rate of the compressed data S1 in the base station 1B as shown in FIG. 9(a).

Incidentally, when a plurality of data are received simultaneously by the base station 1B and the beacon signal interval of each of the data is to be changed, it is preferable to select the minimum interval. In such case, there is no discontinuity of expanded data occurs in any of the radiotelephones, which receive the data transmitted from the base station 1B.

Sixth Embodiment

Figure 10:
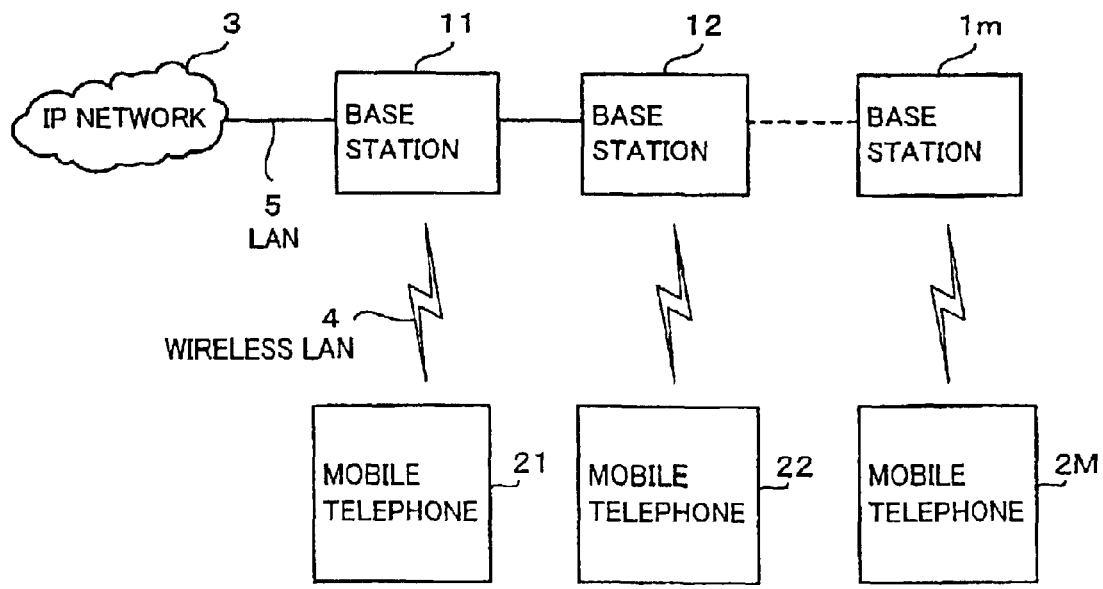
FIG. 10 is a block diagram showing a construction of a network including a base station according to a sixth embodiment of the present invention.

FIG. 10 is a block diagram showing a construction of a network including a plurality of base stations according to a sixth embodiment of the present invention. The base stations 11, 12, . . . , 1m (m is an integer equal to or larger than 2) shown in FIG. 10 are mutually connected through the LAN 5 and each of them has an identical construction to that of the base station 1 shown in FIG. 1. It should be noted, however, the controller 103 has a function of reading the information of the priority data table 104A from the memory 104 and outputting the information to the priority queues 105A and 115A of the buffers 105 and 115 and a function of updating its own priority data table 104A on the basis of the received information of the priority data table. The information reading of the priority data table 104A is performed either periodically or when the content of the priority data table 104A is changed through the input device 109.

In this case, the information of the priority data table 104A of any of the respective base stations 11 to 1m is transmitted to other base stations and radiotelephones 21, 22, . . . , 2M (M is an integer equal to or larger than 2) and the priority data table 104A of each of the base stations 11 to 1m is updated on the basis of the priority data table information transmitted from other base stations and the mobile telephones 21 to 2M. As a result, the mutually connected base stations 11 to 1m and the mobile telephones 21 to 2M can have the priority data tables 104A having identical contents. Therefore, when, for example, the mobile telephones 21 and 2M are communicating with each other through a plurality of base stations 11 to 1m, the base stations 11 and 1m can transmit data at constant interval and the mobile telephones 21 and 2M can receive the data at a constant interval similarly to the case of communication within a single base station. Thus, it is possible to improve QoS.

Incidentally, the object with which one of the base stations 11 to 1m, which exchanges the information of the priority data table 104A, may be at least one of other base stations and the mobile telephones 21 to 2M, which are connected through the wireless LAN and the LAN 5.

The controller 103 of each of the base stations 11 to 1m may transmit only a difference of information caused by changing of the priority data table 104A to the priority queues 105A and 115A to transmit it to other base stations, etc., during a time period from the transmission of the information of the priority data table to a next transmission. In such case, an efficient transmission and update becomes possible.

When the priorities of data are made correspondent to the communication port numbers, etc., a packet to be transmitted contains a control bit for distinguishing between registration and delete, a data transmitting side MAC address, a destination MAC address, a protocol number, a communication port number, a priority of data and an effective time. On the other hand, when the priorities of data are made correspondent to priority bit values of the header, a packet to be transmitted contains a control bit for distinguishing between registration and delete, in which a priority bit value of the header of data and a priority are included.

By transmitting the beacon interval table 104B of each of the base stations 11 to 1m to other base stations and the mobile telephones 21 to 2M and updating the beacon interval table 104B of each of the base stations 11 to 1m on the basis of the information of beacon interval table transmitted from other base stations and the mobile telephones 21 to 2M, similarly to the priority data table 104A, the base stations 11 to 1m and the mobile telephones 21 to 2M can have the beacon interval tables containing identical contents.

By transmitting data of value, which is to be preliminarily set, of each of the base stations 11 to 1m to other base stations and updating the data of the base station on the basis of the data of values, which are to be preliminarily set, transmitted from the other base stations, the base stations 11 to 1m can have the same data commonly.

Incidentally, the technique mentioned with respect to the transmission and the update of the priority data table 104A can be applied to the transmission and update of the beacon inteval table 104B and the above mentioned data.

Seventh Embodiment

Figure 11:
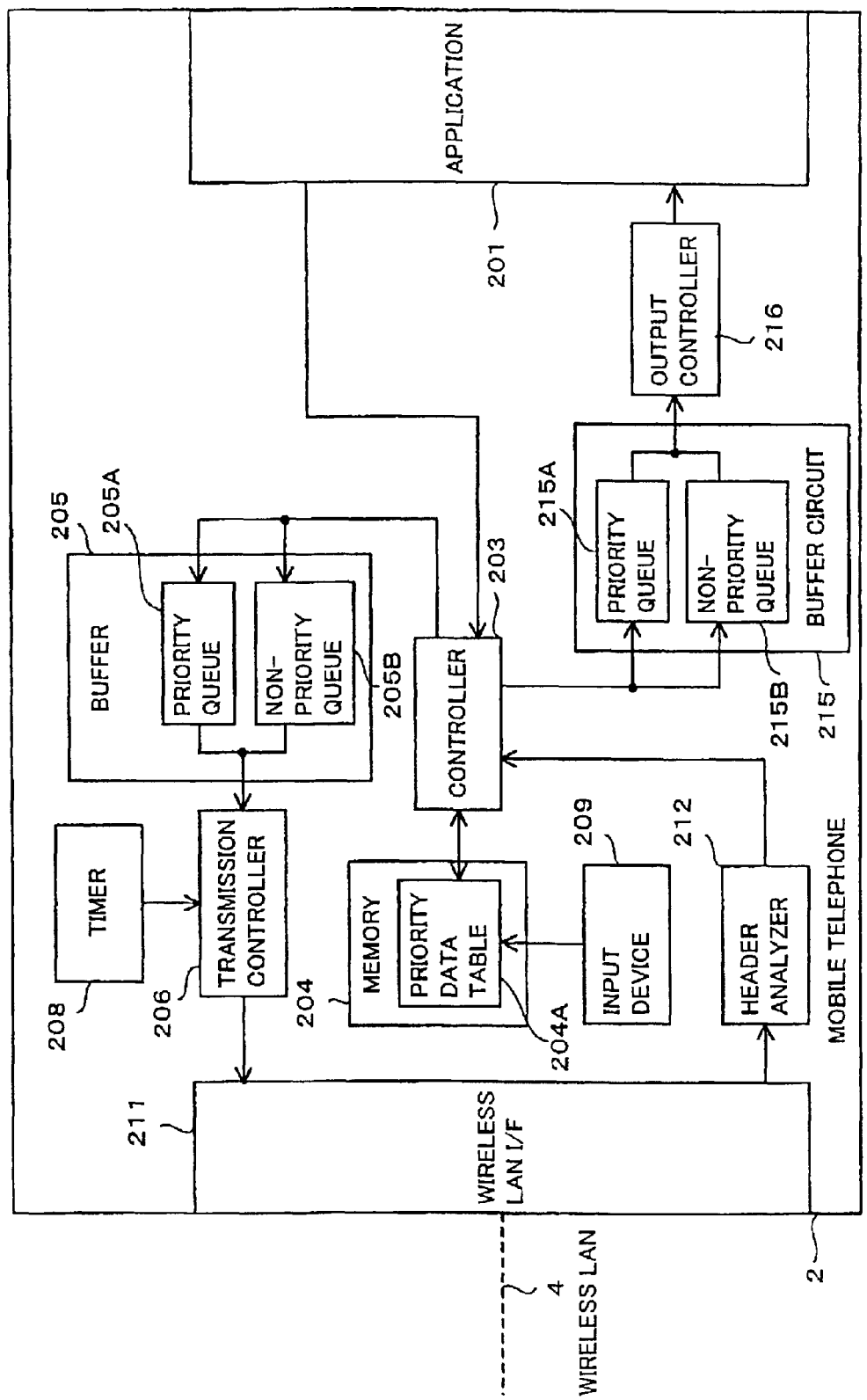
FIG. 11 is a block diagram showing a construction of a mobile telephone according to a seventh embodiment of the present invention.

FIG. 11 is a block diagram showing a construction of a radiotelephone according to a seventh embodiment of the present invention. The mobile telephone 2 shown in FIG. 11 includes an application 201, a controller 203, a memory 204, a buffer 205, a transmission controller 206, a timer 208, an input device 209, a LAN Interface 211, a header analyzer 212, a buffer 215 and an output controller 216.

The application 201 is to realize predetermined services such as telephone function and image sending function.

The memory (table memory means) 204 stores a priority data table (priority table) 204A containing headers of data and priorities corresponding thereto. In more detail, a range of communication port numbers and priorities corresponding thereto, which are described in headers of data, are described in the priority data table 204A. Since a communication port number is set to an application, it is possible to set a priority for every application by making the range of communication numbers correspondent to the priorities.

A data sending side MAC address, a destination MAC address, a protocol number and an effective time, etc., may further registered in the priority data table 204A. When only one of the sending side MAC address and the destination MAC address is registered, it is possible to set the priority with the registered address being fixed. Incidentally, although the priority basically includes 2 or more orders, it may include only one order.

The input device 209 is used to change a content of the priority data table 204A such as to register data to or delete data from the priority data table 204A and is constructed with, for example, a keyboard or a touch panel.

The controller (judge means) 203 judges a priority of data inputted from the application 201 (referred to as "input data", hereinafter) by referring the priority data table 204A. In more detail, the controller 203 judges an input data as a priority data when at least communication port number among the information described in a header of the input data exists in the priority data table 204A and as a non-priority data when there is no communication port number therein and, in the case of the priority data, decides the priority corresponding to the communication port number as the priority of the input data. Further, the controller 203 transmits the priority data to the priority queue 205A of the buffer 205 and the non-priority data to the non-priority queue 205B.

The priority queue (first buffer means) 205A of the buffer 205 buffers the priority data transmitted from the controller 203 and the non-priority queue (second buffer means) 205B buffers the non-priority data. A transmission band is preliminarily set for the priority queue 205A.

The transmission controller 206 performs a control for transmitting the priority data buffered in the priority queue 205A prior to a transmission of the non-priority data buffered in the non-priority queue 205B.

The timer 208 outputs a time data to the transmission controller 206.

The wireless LAN Interface 211 is an interface between it and the wireless LAN 4 and can exchange data between it and the base station 1 through the wireless LAN 4.

The header analyzer 212 analyzes a header of data received by the wireless LAN Interface 211 (referred to as "received data", hereinafter) and outputs a result of analysis to the controller 203.

The above mentioned controller 203 has functions of judging a priority of the received data by referring to the priority data table 204A on the basis of the result of analysis of the header of the received data from the header analyzer 102, transmitting the priority data to the priority queue 215 of the buffer 215 and transmitting the non-priority data to the non-priority queue 215B. The judging method of the priority of the received data is the same as that for the case of the input data.

The priority queue 215A and the non-priority queue 215B of the buffer 215 buffer the priority data and the non-priority data transmitted from the controller 203, respectively. A transmission band is preliminarily set for the priority queue 215A.

The output controller 216 outputs the priority data buffered in the priority queue 215A to the application 201 prior to a transmission of the non-priority data buffered in the non-priority queue 215B thereto.

An operation of the radiotelephone 2 will be described.

When a communication data is outputted from the application 201, the communication data is judged as a priority data if a priority corresponding to a communication port number described in a header of the communication data is registered in the priority data table 204A and as a non-priority data if not registered. When the communication data is judged as the priority data, the communication data is sent to the priority queue 205A of the buffer 205 and then transmitted to the base station 2 sequentially. On the other hand, when the communication data is judged as the non-priority data, the communication data is buffered in the non-priority queue 205B. The radiotelephone 2 is in standby state during a time period in which the communication data is transmitted from the priority queue 205A and, after the transmission of the data from the priority queue 205A is completed, transmits the communication data buffered in the non-priority queue 205B similarly.

By preferentially transmitting data having high priority from the radiotelephone 2 to the base station 1 in this manner, the base station 1 or a destinated radiotelephone can preferentially receive data having high priority. Therefore, it is possible to reduce an amount of delay of data having high priority to thereby improve QoS.

On the other hand, when the radiotelephone receives the communication data from the base station 1, it analyzes the header of the communication data and judges the communication data as a priority data when if a priority corresponding to a communication port number described in the header of the communication data is registered in the priority data table 204A and as a non-priority data if not registered. When the communication data is judged as the priority data, the communication data is sent to the priority queue 215A of the buffer 215 and then transmitted to the application 201 sequentially. On the other hand, when the communication data is judged as the non-priority data, the communication data is buffered in the non-priority queue 215B. The radiotelephone 2 is in standby state during a time period in which the communication data is transmitted from the priority queue 215A and, after the transmission of the data from the priority queue 215A is completed, transmits the communication data buffered in the non-priority queue 215B, similarly.

By preferentially transmitting data having high priority from the radiotelephone 2 to the application 201 in this manner, it is possible to reduce an amount of delay of data having high priority to thereby improve QoS.

Incidentally, the priority of data transmitted from the base station 1 during the transmission phase is judged on the priority data table 204A from the data sensing side MAC address and the communication port number and, when the data having the priority is buffered in the buffer 205, the buffered data may be transmitted to the base station 1 in the receiving phase of the base station, as in the case of the fourth embodiment of the present invention.

Further, each of the buffers 205 and 215 may have a plurality of priority queues as in the case of the buffer 305 shown in FIG. 4.

Now, the back-off will be described.

Figure 12:
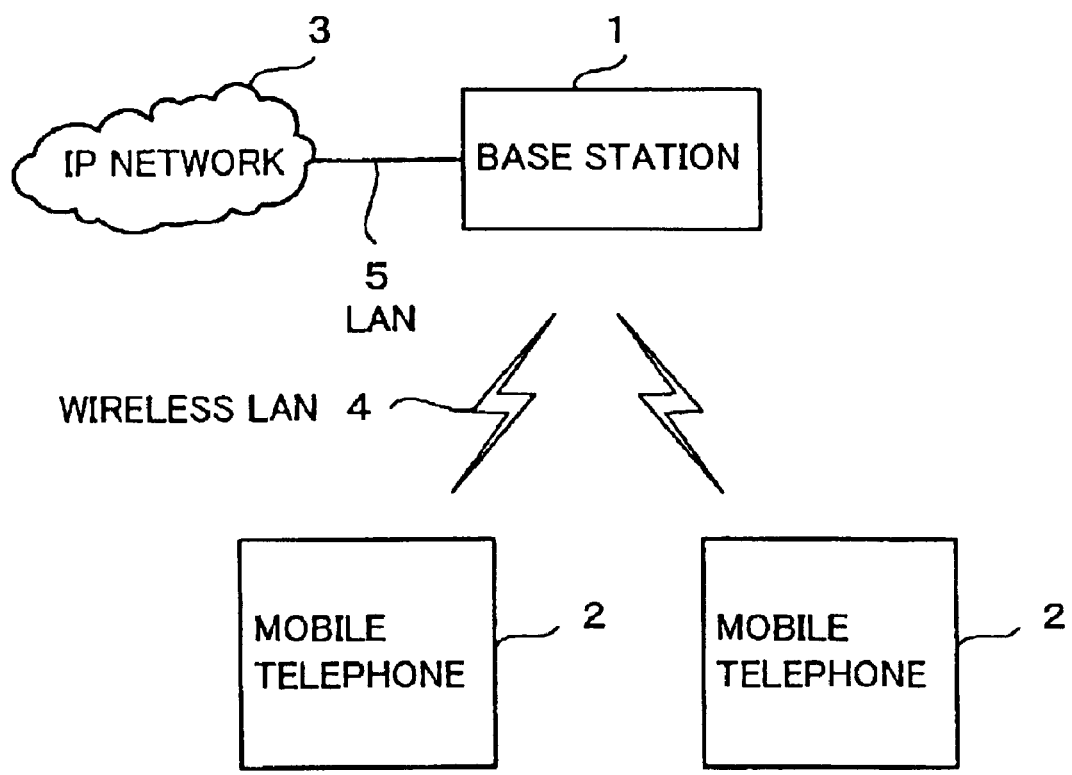
FIG. 12 is a block diagram showing a state where data transmissions from a plurality of mobile telephones 2 to a base station 1 are competing.

As shown in FIG. 12, the radiotelephone 2 has a back-off function of becoming a standby state for a back-off time, which is randomly set, when the radiotelephone 2 and other radiotelephone 2A complete with in transmission of data to the base station 1. Since the back-off times of the plurality of mobile telephones 2 and 2A are different when these mobile telephones are in standby state by this function, probability of competetion of the mobile telephone 2 with the other mobile telephone 2A in a next data transmission becomes lower.

In this case, the maximum value of back-off time in transmission of the priority data may be made settable to a value smaller than the maximum value of back-off time in transmission of the non-priority data by the transmission controller 206. Alternatively, the maximum value of back-off time in transmission of the priority data may be made settable to a value smaller than a preliminarily set value by the transmission controller 206. Since, in these cases, the back-off time in transmission of the priority data is reduced, the preferential transmission of the priority data precedingly to the non-priority data tends to be easier. In these cases, the maximum value of the back-off time may be made smaller with the higher the priority of data. In the latter case, data having higher priority tends to be transmitted at higher speed.

Further, the transmission controller 206 may reduce the back-off time with higher priority data. In such case, data having higher priority tends to be transmitted at higher speed. Incidentally, in this case, the back-off time for the non-priority data is made maximum.

The described functions of the base stations 1, 1A and 1B and the mobile telephones 2 can be realized by executing programs by a computer.

Incidentally, the base stations 1, 1A and 1B are not always necessary to be connected to the LAN 5.

As described hereinbefore, according to the present invention, a wireless terminal can receive priority data at a constant interval by setting priorities in finer classification compared with the coventional classification by setting the priority for every application and transmitting the data having the thus set priority from the base station at a constant interval. Therefore, it is possible to reduce the variation of delay in data reception in the wireless terminal to thereby improve QoS.

Further, in the wireless terminal of the present invention, it is possible to reduce delay of data having high priority by preferentially outputting it to an application of the wireless terminal to thereby improve QoS.

Further, in the wireless terminal of the present invention, by preferentially transmitting data having high priority from the wireless terminal to a base station, the base station or a destinated wireless terminal can receive the data having high priority preferentially. Therefore, it is possible to reduce delay of data having high priority to thereby improve QoS.

What is claimed is:

1. A base station for a wireless local area network, connected to at least one wireless terminal through the wireless local area network, comprising:
    table memory means for storing a priority table of data indicative of priority of data set for every application;
    first buffer means for buffering data having priority set;
    second buffer means for buffering data whose priority is not set;
    judge control means for judging priority of received data on the basis of the priority table and outputting data whose priority is set to said first buffer means and the data whose priority is not set to said second buffer means;
    beacon signal transmission means for transmitting a beacon signal for synchronizing a communication with said wireless terminal at a constant interval; and
    transmission control means for transmitting the data buffered in said first buffer means to a destination at a constant interval by using the beacon signal as a reference and, after the data buffered in said first buffer means is transmitted, transmitting the data buffered in said second buffer means to a destination.

2. The base station as claimed in claim 1, wherein a plurality of said first buffer means are provided correspondingly to priorities of the data.

3. The base station as claimed in claim 2, wherein said transmission control means includes means for transmitting the data for every time, which is predetermined correspondingly to priority of the data, during a time period from a time at which the beacon signal is transmitted to a time at which a next beacon signal is transmitted.

4. The base station as claimed in claim 3, wherein said transmission control means includes means for determining a transmission time of the data on the basis of a slot time defined by IEEE 802.11.

5. The base station as claimed in claim 3, wherein said transmission control means includes means for transmitting data buffered in said first buffer means according to a preset sequence of said first buffer means.

6. The base station as claimed in claim 5, wherein said transmission control means includes means for transmitting data buffered in said first buffer means at a constant interval.

7. The base station as claimed in claim 3, further comprising:
    input means for changing the predetermined amount or the predetermined time;
    transmission means for transmitting the predetermined amount or the predetermined time to other base stations connected through said LAN periodically or when the content of the predetermined amount or the predetermined time is changed by the input means; and
    update means for, when the other base stations receive the predetermined amount or the predetermined time, updating the predetermined amount or the predetermined time of the other base stations on the basis of received predetermined amount or the predetermined time.

8. The base station as claimed in claim 2, wherein said transmission control means includes means for transmitting data buffered in said first buffer means in a priority sequence of data and, after data buffered in any one of said first buffer means, which has a priority to be transmitted, is transmitted, transmitting data buffered in said first buffer means corresponding to a next priority.

9. The base station as claimed in claim 8, wherein said transmission control means further includes means for transmitting, when data to be transmitted is absent in one of said first buffer means, data buffered in one of said first buffer means corresponding to a next priority by jumping said first buffer to be transmitted.

10. The base station as claimed in claim 9, wherein said transmission control means includes means for transmitting, when data having higher priority than that of data under transmission is buffered in said jumped first buffer means, the data buffered in said jumped first buffer means after the current data transmission is completed.

11. The base station as claimed in claim 2, wherein said transmission control means includes means for transmitting data buffered in said first buffer means by every predetermined amount of data or for every predetermined time according to a preset sequence of said first buffer means.

12. A base station as claimed in claim 1, wherein said judge control means includes
    means for producing a first buffer means corresponding to a priority of received data when the priority of the received data is registered in the priority table; and means for deleting said first buffer means when data having priority corresponding to said first buffer means is not received for a predetermined time.

13. The base station as claimed in claim 1, further comprising data size regulation means for regulating size of data outputted from said judge control means to a predetermined size and outputting the size-regulated data to said first buffer means or said second buffer means.

14. The base station as claimed in claim 1, further comprising transmission time regulation means for monitoring a transmission time of data transmitted from said transmission control means and, when a transmission time of data buffered in said second buffer means is shorter than a predetermined time, instructing said transmission control means of shortening of a transmission time of data buffered in said first buffer means.

15. The base station as claimed in claim 1, further comprising means for providing a transmission phase for performing a transmission of data to said wireless terminal and a receiving phase for performing a reception of data from said wireless terminal in different time periods each between adjacent beacon signals.

16. The base station as claimed in claim 15, further comprising means for transmitting a transmission request to a wireless terminal having PCF (Point Coordination Function) defined by IEEE 802.11 in the transmission phase and receiving data transmitted from said wireless terminal, which receives the transmission request, in the receiving phase.

17. The base station as claimed in claim 1, further comprising means for providing a transmission phase for performing a transmission of data to said wireless terminal and a receiving phase for performing a reception of data from said wireless terminal in a time period between adjacent beacon signals.

18. The base station as claimed in claim 1, wherein said priority table records at least a range of communication port number and priority in correspondence with each other and said judge control means includes means for judging the priority on the basis of the communication port number of data received.

19. The base station as claimed in claim 1, wherein said priority table records a value of priority bit of a header of data and priority in correspondence with each other and said judge control means includes means for judging the priority on the basis of the priority bit of the data received through said LAN.

20. The base station as claimed in claim 19, wherein the priority bit is defined in a reserve bit of a service field of PLCP (Physical Layer Convergence Procedure) header defined by IEEE 802.11.

21. The base station as claimed in claim 19, wherein said priority bit is defined in TOS (Type of Service) field of IP header.

22. The base station as claimed in claim 1, further comprising:
means for transmitting GARP (Generic Attribute Registration Protocol) defined by IEEE 802.1d, q to nodes connected to said LAN; and
means for broadcasting, when data having destination to a group MAC address registered in GARP is received, the received data to said wireless terminals.

23. The base station as claimed in claim 1, wherein
said table memory means further stores a beacon interval table for corresponding header value of data with the interval between beacon signals,
said judge control means includes means for detecting the header value of the received data and, when the detected header value exists in the beacon interval table, reading an interval corresponding to the detected header value and outputting the latter to the beacon signal producing means, and
said beacon signal producing means includes means for changing the interval of the beacon signal to an interval inputted from said judge control.

24. The base station as claimed in claim 23, wherein, when there are a plurality of beacon signal intervals to be changed, said judge control means includes means for selecting a minimum interval and outputting it to said beacon signal producing means.

25. The base station as claimed in claim 23, further comprising:
input means for changing a content of the beacon interval table;
transmission means for transmitting a beacon interval table to other base stations connected through said LAN periodically or when the content of the beacon interval table is changed by said input means; and
update means for, when the other base stations receive the beacon interval table, updating beacon interval tables of the other base stations on the basis of received beacon interval table.

26. The base station as claimed in claim 25, wherein said transmission means includes means for transmitting an information, which is changed in the beacon interval table, during a time period from the transmission of the beacon interval table to a next transmission thereof.

27. The base station as claimed in claim 1, further comprising:
input means for changing a content of said priority table;
transmission means for transmitting said priority table to other base stations and at least one of wireless terminals connected through the LAN periodically or when the content of said priority table is changed by said input means; and
update means for, when the other base stations and the at least one wireless terminal receive said priority table, updating priority tables of the other base stations and the at least one wireless terminal on the basis of received priority table.

28. The base station as claimed in claim 27, wherein said transmission means includes means for transmitting an information, which is changed by said priority table, during a time period from the transmission of the priority table to a next transmission thereof.

29. The base station as claimed in claim 28, wherein said transmission means includes means for transmitting a packet including control bits for distinguishing between registration and delete, which include MAC address of data transmitting side, MAC address of destination side, protocol number, communication port number and priority.

30. The base station as claimed in claim 28, wherein said transmission means includes means for transmitting a packet including control bits for distinguishing between registration and delete, which include value of priority bit of header of data and priority.

31. A wireless terminal connected a base station through a wireless local area network, comprising:
table memory means for storing a priority table of data indicative of priority of data set for every application;
first buffer means for buffering data having priority set;
second buffer means for buffering data whose priority is not set;

judge means for judging priority of received data on the basis of said priority table and outputting data having priority set to said first buffer means and data having priority not set to said second buffer means; and output control means for transmitting the data buffered in said first buffer means to an application of its own terminal preceding to data buffered in said second buffer means.

32. A wireless terminal connected to a base station through a wireless local area network, comprising an application for executing a predetermined service;

table memory means for storing a priority table indicative of priority of data set for every application;

first buffer means for buffering data having priority set;

second buffer means for buffering data whose priority is not set;

judge means for judging priority of data inputted from said application on the basis of said priority table and outputting data having priority set to said first buffer means and data having priority not set to said second buffer means; and transmission control means for preferentially transmitting the data buffered in said first buffer means to a base station preceding to the data buffered in said second buffer means.

33. The wireless terminal as claimed in claim 32, wherein said priority table records at least a range of communication port number and priority in correspondence with each other and said judge control means includes means for judging the priority on the basis of the communication port number of data inputted from said application.

34. The wireless terminal as claimed in claim 33, wherein said judge means includes means for judging priority of data on the basis of transmitting side MAC address and communication port number of the data transmitted from the base station in said priority table and said transmission control means includes means for transmitting data having priority judged by said judge means to the base station in a receiving phase in which the base station receives data from said wireless terminal.

35. The wireless terminal as claimed in claim 32, wherein said transmission control means includes back-off means, which becomes standby state for a randomly set back-off time when the base station competes in transmission of data with other wireless terminal.

36. The wireless terminal as claimed in claim 35, wherein said back-off means includes means for setting the maximum value of the back-off time in transmitting data having priority set to a value smaller than the maximum value of the back-off time in transmitting data having priority not set.

37. The wireless terminal as claimed in claim 35, wherein said back-off means includes means for setting the maximum value of the back-off time in transmitting data having priority set to a value smaller than a predetermined value.

38. The wireless terminal as claimed in claim 35, wherein said back-off means includes means for setting the back-off time correspondingly to the priority of data to be transmitted.

39. A program used in a computer to realize:

a table memory function of storing a priority table of data indicative of priority of data set for every application;

a first buffer function of buffering data having priority set;

a second buffer function of buffering data whose priority is not set;

a judge control function of judging priority of received data on the basis of the priority table and outputting data whose priorities are set to the first buffer function and the data whose priorities are not set to the second buffer function;

a beacon signal transmission function of transmitting a beacon signal for synchronizing a communication with a wireless terminal at a constant interval; and a transmission control function of transmitting the data buffered by the first buffer function to a destination at a constant interval by using the beacon signal as a reference and, after the data buffered by the first buffer function is transmitted, transmitting the data buffered by the second buffer function to a destination.

40. A program used in a computer to realize:

a table memory function of storing a priority table of data indicative of priority of data set for every application;

a first buffer function of buffering data having priority set;

a second buffer function of buffering data whose priority is not set;

a judge function of judging priority of received data on the basis of the priority table and outputting data whose priority is set to the first buffer function and the data whose priority is not set to the second buffer function; and a output control function of outputting the data buffered by the first buffer function to an application of own terminal preceding to the data buffered by the second buffer function.

41. A program used in a computer to realize:

a table memory function of storing a priority table of data indicative of priority of data set for every application for executing predetermined services;

a first buffer function of buffering data having priority set;

a second buffer function of buffering data whose priority is not set;

a judge function of judging priority of received data on the basis of the priority table and outputting data whose priority is set to the first buffer function and the data whose priority is not set to the second buffer function; and a transmission control function of outputting the data buffered by the first buffer function to a base station preceding to the data buffered by the second buffer function.

* * * * *